United States Patent [19]

Quinn et al.

[11] Patent Number: 5,336,298
[45] Date of Patent: Aug. 9, 1994

[54] POLYELECTROLYTE MEMBRANES FOR THE SEPARATION OF ACID GASES

[75] Inventors: Robert Quinn, East Texas; Daniel V. Laciak, Allentown; John B. Appleby, Perkiomville; Guido P. Pez, Allentown, all of Pa.

[73] Assignee: Air Products and Chemicals, Inc., Allentown, Pa.

[21] Appl. No.: 38,780

[22] Filed: Mar. 29, 1993

[51] Int. Cl.$^5$ .............................................. B01D 53/22
[52] U.S. Cl. ........................................ 95/49; 95/51; 95/52
[58] Field of Search ........................ 95/47, 49, 51, 52

[56] References Cited

U.S. PATENT DOCUMENTS

| | | | |
|---|---|---|---|
| 2,966,235 | 12/1960 | Kammermeyer | 95/51 |
| 3,447,286 | 6/1969 | Dounoucos | 55/158 |
| 3,534,528 | 10/1970 | Porter | 95/49 |
| 3,653,180 | 4/1972 | Juliano et al. | 95/49 X |
| 3,758,603 | 9/1973 | Steigelmann et al. | 260/677 |
| 3,780,496 | 12/1973 | Ward, III et al. | 55/16 |
| 3,819,806 | 6/1974 | Ward, III | 423/220 |
| 4,089,653 | 5/1978 | Ward, III | 23/284 |
| 4,318,714 | 3/1982 | Kimura et al. | 55/16 |
| 4,561,864 | 12/1985 | Klass et al. | 95/49 |
| 4,606,740 | 8/1986 | Kalprathipanja | 95/47 |
| 4,608,060 | 8/1986 | Kalprathipanja et al. | 95/47 |
| 4,666,468 | 5/1987 | Wu | 95/51 X |
| 4,701,186 | 10/1987 | Zampini | 55/158 |
| 4,710,204 | 12/1987 | Kraus et al. | 95/49 |
| 4,741,744 | 5/1988 | Wu et al. | 55/16 |
| 4,758,250 | 7/1988 | Laciak et al. | 55/16 |
| 4,780,114 | 10/1988 | Quinn et al. | 55/16 |
| 4,781,733 | 11/1988 | Babcock et al. | 95/49 |
| 4,783,202 | 11/1988 | Kraus et al. | 95/49 |
| 4,789,386 | 12/1988 | Vaughn et al. | 55/16 |
| 4,828,585 | 5/1989 | Chiao | 95/47 |
| 4,834,779 | 5/1989 | Paganessi et al. | 95/51 X |
| 4,909,810 | 3/1990 | Nakao et al. | 95/52 |
| 4,994,095 | 2/1991 | Kawakami et al. | 95/51 |
| 5,055,114 | 10/1991 | Kawakami et al. | 95/51 |
| 5,234,471 | 8/1993 | Weinberg | 95/47 |

FOREIGN PATENT DOCUMENTS

| | | | |
|---|---|---|---|
| 50-140682 | 11/1975 | Japan | 95/51 |
| 1-070125 | 3/1989 | Japan | 95/49 |

OTHER PUBLICATIONS

O. H. Le Blanc, et al., "Facilitated Transport in Ion-Exchange Membranes", J. Memb. Sci.; 6, 339–343 1980.

J. D. Way, et al., "Facilitated Transport of $CO_2$ in Ion Exchange Membranes", AICHE Journal, vol. 33, No. 3, Mar. 1987, p. 480 (1987).

J. D. Way, et al., "Competitive Facilitated Transport of Acid Gases in Perfluorosulfuric Acid Membranes", J. Memb. Sci., 46, 309–324 (1989).

K. I. Itoh, et al., "Sorption and Permeation Behavior of Water Vapor and Carbon Dioxide Gas through Ethylene Ionomer Membranes," J. Appl. Polym. Sci., vol. 32, 3335–3343, (1986).

Primary Examiner—Robert Spitzer
Attorney, Agent, or Firm—Mark L. Rodgers; William F. Marsh

[57] ABSTRACT

Acid gases are separated from a gas stream by bringing the gas stream into contact with a multilayer composite membrane comprising a nonselective polymeric support layer and an active separating layer comprising a polyelectrolyte polymer which contains cationic groups which are electrostatically associated with anions for which the $pK_a$ of the conjugate acid is greater than 3.

17 Claims, No Drawings

POLYELECTROLYTE MEMBRANES FOR THE SEPARATION OF ACID GASES

FIELD OF THE INVENTION

The present invention relates to a membrane-based process for the removal of acid gases from gas mixtures containing acid gases and other components.

BACKGROUND OF THE INVENTION

Several attempts have been made in the past to develop a suitable membrane for the selective separation of acid gas from other gases present in a gas stream. U.S. Pat. No. 3,780,496 discloses the use of sulfonated poly(xylylene oxide) and metal salts thereof for separating $CO_2$ from gas mixtures. The sulfonated poly(xylylene oxide) material is an ionomer with the corresponding membrane exhibiting $CO_2$ to $CH_4$ selectivities in the range from 28 to 50; however, $CO_2$ to $H_2$ selectivities are reported to be less than one.

U.S. Pat. No. 4,318,714 describes the use of ion exchange membranes for the separation of gases. It is stated that selective permeation of acid gases occurs by reversible reaction of the gas to be permeated with the counterions of the membrane. The membranes are described as being made from cross-linked, water insoluble (but water swellable) ion exchange polymer materials. Both anionic and cationic ion exchange membranes are disclosed. The data described in this patent was also disclosed in an article by LeBlanc, et al. *J. Memb Sci.* 6, 339–343 (1980).

J. D. Way, et al. *AIChE Journal,* 33, 480–487 (1987) describe the permselective properties of Nafion membranes containing monoprotonated ethylenediamine (EDAH+) counterions in addition to membranes containing Na+ ions. The EDAH+ membrane, unlike the Na+ membrane, exhibits properties consistent with permeation of $CO_2$ by a facilitated transport mechanism and $CO_2$ to $CH_4$ selectivities of 88 to 550. Additionally, Way, J. D. and Noble, R. D., *J. Memb. Sci.* 46, 309–324 (1989) have also demonstrated the separation of $CO_2$ from $H_2S$ using such membranes; the presence of $CO_2$ suppresses the permeation of $H_2S$ and $CO_2$ permeates preferentially with $CO_2$ to $H_2S$ selectivities of 5.4 to 8.3.

U.S. Pat. No. 4,758,250 discloses the use of anion exchange polyelectrolyte membranes which selectively permeate $NH_3$ from $N_2$ containing mixtures. As an example is cited the performance of a membrane consisting of poly(vinylammonium thiocyanate). $NH_3$ to $N_2$ selectivities of greater than 1000 are reported along with relatively high $NH_3$ permeances. Also described is the fabrication and testing of an encapsulated or "sandwich" membrane in which a layer of anion exchange polyelectrolyte membrane is encapsulated between two layers of poly(trimethylsilylpropyne) (PTMSP). Such a membrane exhibited an $NH_3$ to $H_2$ selectivity of 6200. There is no indication or teaching of a selective permeation of gases other than ammonia.

U.S. Pat. No. 4,701,186 discloses the use of asymmetric ammonium-containing polymers. Polymers such as polysulfone or brominated polyarylene oxide were treated with ammonia or ammonium hydroxide and then exposed to a hydrohalic acid (e.g. HBr) generating an ammonium salt in the membrane. This treatment resulted in a substantial increase in selectivities accompanied by only a moderate reduction in gas permeabilities. The highest $CO_2/CH_4$ selectivity reported was 54 but $CO_2/H_2$ selectivities were only 0.2.

U.S. Pat. No. 4,789,386 discloses the use of ionomeric membranes in which the ionomer contains various metal cations bound to carboxylate groups. The membranes are claimed for separations involving $CO_2$ from $CH_4$ and $N_2$ from $O_2$ but selectivities of $CO_2$ to $CH_4$ of 6 to 8 are cited.

Itoh et al. *J. Appl. Polym. Sci.* 32, 3325–3343 (1986) reported the use of ethylene ionomer membranes which permeate water and $CO_2$. The membrane consists of an ethylene-methacrylic acid copolymer. Cations, $Na^+$ or $Zn^{2+}$, were introduced by partial neutralization of the acid residues. A typical membrane contained 0.035–0.054 mole fraction of methacrylic acid with 40 to 60% of the acid neutralized. $CO_2$ permeabilities decreased with increasing $CO_2$ feed pressure and ranged from about 10 to 8 Barrers. No selectivity data was reported.

U.S. Pat. No. 4,741,744 discloses the use of Nafion ionomer membranes which contain hydrated metal ions as the counterion. It is stated that the membranes have improved gas permeabilities with comparable gas selectivities over the unhydrated analogs. For example, a membrane containing $Ni^{2+}$ ions in the presence of water exhibits a $CO_2$ permeance about 18 times that of $Ni^{2+}$ in the absence of water but the selectivities are comparable, 32 versus 36.

Traditionally, the active separation layer of facilitated transport membranes has consisted of a liquid which reacts reversibly with a specific gas(es). The liquid is generally supported in a thin microporous matrix as for example in U.S. Pat. No. 3,819,806.

Methods have been described for the construction of multi-layer membranes in which a film of such liquid-containing microporous matrix is supported on a gas-permeable but liquid-impermeable polymer layer. U.S. Pat. No. 3,758,603 discloses the use of silicone rubber to back immobilized liquid membranes. This approach was taken one step further in U.S. Pat. No. 3,447,286 which discloses the encapsulation of an immobilized liquid membrane in between gas-permeable but liquid-impermeable polymer layers. This patent describes a membrane consisting of a liquid immobilized in the micropores of a Dacron mat, which was enclosed between the two sheets of silicone rubber. Similar membranes are disclosed in U.S. Pat. No. 4,089,653 but generally containing more than one immobilized liquid layer. More recently, U.S. Pat. No. 4,780,114 disclosed membranes consisting of molten salt hydrates supported in microporous supports and encapsulated in poly(trimethylsilylpropyne) or silicone rubber.

U.S. Pat. No. 4,758,250 discloses a water soluble ammonia permselective polymer contained or encapsulated within a water insoluble polymer which exhibits relatively high gas permeabilities. An example is given of such a multi-layer membrane consisting of an active layer of poly(vinylammonium thiocyanate) between two sheets of poly(trimethylsilylpropyne). Such a membrane is disclosed as being useful for the separation of ammonia. No indication was given that such membranes could be used to separate acid gases.

SUMMARY OF THE INVENTION

The present invention is a process for separating acid gas from a gas mixture containing acid gas and at least one other component. The gas mixture is brought into contact with a multilayer composite membrane comprising a nonselective polymeric support layer and an active separating layer. The active separating layer comprises a polyelectrolyte polymer wherein the polymer contains cationic groups which are associated electrostatically with anions for which the $pK_a$ of the conjugate acid is greater than 3. The acid gas component of the gas mixtures selectively permeates the membranes thereby removing it from the other components of the gas mixture.

DETAILED DESCRIPTION

The present invention is a process which uses a multilayer composite membrane for selectively removing acid gases such as $CO_2$, $H_2S$, COS, $SO_2$ and $NO_x$ from gas mixtures while retaining non-acid gases, such as $H_2$, $CH_4$, $N_2$, $O_2$ and CO, at pressure in the feed stream to the membrane. The membrane used in this process comprises a minimum of two layers, and more typically three layers, at least one of which consists of polyelectrolyte which reacts reversibly with acid gases. This reactivity with acid gases results in the polyelectrolyte having relatively high acid gas permeabilities and low permeabilities for nonreactive gases. At least one layer of the membrane, and more typically two, comprise a conventional polymeric material which exhibits relatively large permeabilities of all gases. Examples of such conventional polymeric materials include poly(dimethylsiloxane) and poly(trimethylsilylpropyne). The polymeric layers supply mechanical support for the polyelectrolyte layer and protect it from the environment. Such polymeric materials may be porous, and optionally may have asymmetrically distributed pore sizes.

Such multilayer composite membranes are unique relative to typical polymeric membranes in that they retain $H_2$ and $CH_4$ while permeating acid gases. Typically, $H_2$ permeabilities of polymeric membranes are high and comparable to those of $CO_2$ and $H_2S$. Thus, $CO_2$ to $H_2$ and $H_2S$ to $H_2$ selectivities are relatively small. The multilayer composite membranes of the present invention exhibit relatively high $CO_2$ to $H_2$ and $H_2S$ to $CH_4$ selectivities. Hence, these membranes permit the application of membrane technology to separations which were unachieveable using earlier membranes.

These composite membranes may be used in any configuration known in the art, such as flat sheets, spiral wound, hollow fiber, plate and frame, and the like.

As stated above, the active separating layer of these composite membranes is a polyelectrolyte polymer which contains cationic groups which are associated electrostatically with "mobile" anions for which the $pK_a$ of the conjugate acid is greater than 3. The value of the $pK_a$ is that obtained for the conjugate acid as determined in a dilute aqueous solution. Examples of suitable anions include $F^-$ ($pK_a$ HF=3.45) and the acetate ion ($pK_a$ acetic acid=4.75). Typically, the polyelectrolyte contains bound water which solvates the anion. Examples of suitable polyelectrolytes include poly(diallyldimethylammonium fluoride) (PDADMAF), poly(vinylbenzyltrimethylammonium fluoride) (PVBTAF), poly(diallyldimethylammonium acetate) (PDADMAOAc), poly(vinylbenzyltrimethylammonium acetate) (PVBTAOAc), poly(vinyl N-methylpyridinium fluoride), poly(vinyl N-methylpyridinium acetate), poly(vinyl N,N-dimethylimidazolium fluoride), poly(vinyl N,N-dimethylimidazolium acetate), poly (N ,N-dimethylethyleneimine fluoride), poly(N,N-dimethylethyleneimine acetate), poly(2-hydroxypropyl dimethylammonium fluoride), poly(2-hydroxypropyl dimethylammonium acetate), and the like. Optionally, the membranes may contain more than one polyelectrolyte layer, which layer may contain the same or different polyelectrolytes.

The most efficient mode of operation of these multilayer composite membranes is by using a sweep gas to remove those components which permeate the membrane. Example 6 below, however, shows that these membranes can be used effectively without the use of a sweep gas.

Polyelectrolytes as used herein are distinguishable from ionic polymers and ion-exchange polymers in that polyelectrolytes have a relatively high ionic content, i.e., up to one ionic unit per polymer repeat unit. Ionic polymers, on the other hand, are compounds where organic or inorganic salt groups are attached to a polymer chain and which have relatively low ionic content, usually less than 10 mole % with respect to the polymer chain repeat unit. Ion exchange polymers generally consist of an insoluble polymer matrix or resin to which are attached ionizable functional groups. Cation exchange resins have a fixed negative charge on the polymer matrix with exchangeable cations (and vice-versa for anion-exchange resins).

While not being bound by theory, it is believed that facilitated transport of $CO_2$ by polyelectrolyte membranes arises from a reversible reaction of $CO_2$ with hydroxide ions generated in the polyelectrolyte. For example, in PDADMAF, the acid/base reaction of fluoride ions and water results, in effect, in the formation of hydroxide ions which in turn react with $CO_2$ to form bicarbonate. This is represented in a simplified reaction scheme below:

$$2F^- + H_2O \rightleftharpoons HF_2^- + OH^- \qquad (1)$$

$$OH^- + CO_{2(g)} \rightleftharpoons HCO_3^- \qquad (2)$$

Other relatively basic anions, such as acetate, will react as does $F^-$ in (1) and thus the presence of such anions in polyelectrolyte membranes will result in facilitated transport of $CO_2$. In general, it is reasonable to expect that a polyelectrolyte membrane containing an anion for which the $pK_a$ of its conjugate acid is greater than 3 will result in facilitated transport of $CO_2$.

Polyelectrolytes which result in the selective permeation of $CO_2$ generally do not contain counterions or groups on the polymer backbone which have ionizable hydrogen atoms. For example, a polyelectrolyte containing a protonated primary amine such as poly(vinylammonium chloride) provides a medium which is too acidic to facilitate transport of $CO_2$. In other words, the concentration of hydroxide ion is so small that reaction (1) and hence (2) do not occur to an appreciable extent. Thus, to permeate $CO_2$, the polyelectrolyte should preferably contain fully alkylated ammonium groups.

Transport of $H_2S$ by reactions analogous to those for $CO_2$ can be represented by the following reaction scheme involving PDADMAF.

$$2F^- + H_2O \rightleftharpoons HF_2^- + OH^- \qquad (1)$$

$$OH^- + H_2S \rightleftharpoons HS^- + H_2O \qquad (3)$$

Polyelectrolytes such as PDADMAF which contain relatively basic anions ($pK_a$ of the conjugate acid greater than 3) exhibit unique properties relative to other polyelectrolytes. This is illustrated by the comparative example 13. If poly(diallyldimethylammonium chloride) (PDADMACl) is used in place of PDADMAF, very different permselective properties are obtained. As shown in Example 13, the $CO_2$ permeance at comparable feed pressures of a PDADMACl membrane is about 3 to 5% of that of a PDADMAF membrane. In addition, gas permeation of a PDADMACl containing membrane is largely nonselective.

Since the polyelectrolytes of the present invention react reversibly with acid gases, it is believed that such polymers may be useful as acid gas absorbents. It is believed that such polyelectrolytes would have relatively large absorption capacities for acid gases and could be used in conventional absorption systems, such as PSA and VSA systems.

The following examples are presented to better illustrate the present invention and are not meant to be limiting.

EXPERIMENTAL

Multilayer composite membranes were fabricated by successive casting and drying of the respective polymer solutions using blade coating techniques. PTMSP was used as a 2 wt % solution in hexane or toluene; PDMS was a 4–5 wt % solution in $CH_2Cl_2$. PDADMAF and other polyelectrolyte solutions were used as 0.5–3 wt % solutions in water. In some cases, a surfactant, sodium dodecylsulfate (SDS) in water or Surfynol 61, was added to the aqueous phase to improve wetting properties. The films were cast onto a level, clean glass plate which had been rinsed i n methanol and dried at 80° C. At all times a shroud was kept over the membranes to limit accumulation of dust or other debris on the surface of the membrane. The shroud was constantly purged with $N_2$.

The membrane apparatus used was similar to that described by Bateman, et al. The membrane was sealed in a stainless steel cell similar that described by Otto and Quinn. The feed gas to the membrane cell was obtained from premixed gases cylinders. Either nitrogen or helium was used as a sweep gas. A 10.0 $cm^3$(STP)/m flow rate for both the feed and sweep gases was maintained by the passage of gases through flow controllers. Feed gas pressures greater than ambient were maintained by the use of a back pressure regulator. The sweep gas pressure was atmospheric. Both the feed and sweep gases, except where indicated, were humidified by passage through constant temperature water bubblers. The feed gas was passed over one surface of the membrane and the sweep over the other. The sweep was then passed through the sample loop of a gas chromatograph and a sample for analysis was injected periodically. Data was collected over minimum of 24 h. The determination of the concentration of permeating gases permitted calculation of gas flux. Permeance, $P_o/l$, in units of $cm^3$(STP)/$cm^2 \cdot s \cdot cmHg$ was calculated using the equation below:

$$P_o/l = J/A\Delta P$$

where J is the flux in $cm^3$(STP)/s, A is the membrane area in $cm^2$ and $\Delta P$ is the difference in the feed and permeate partial pressures of gas in cmHg. For all membranes tested, A was 3.77 $cm^2$. In general the partial pressure of permeating gases were relatively small compared with the corresponding feed partial pressures and $\Delta P$ was approximated as the feed partial pressure. Selectivity is the ratio of permeances or permeabilities of two gases.

EXAMPLES

Example 1

$CO_2$ Membrane—PDMS/PDADMAF/PDMS

A PDMS/PDADMAF/PDMS membrane was prepared as described above. The PDADMAF layer was cast from a solution containing 30 mL 2.4 wt % PDADMAF and 0.08 g of 1.0 wt % SDS. The membrane performance was evaluated at room temperature using a feed gas containing 23.0% $CO_2$, 23.1% $CH_4$ in $H_2$ and a $N_2$ sweep gas. Both streams were humidified by passage through water bubblers at 5° C. Performance results are listed below. $CH_4$ was not detected in the permeate. $CO_2/CH_4$ selectivities listed below are estimates of minimum values based on a $CH_4$ limit of detection of 25 ppm and assuming that $CH_4$ permeance is independent of feed pressure.

| Feed (psig) | $(P_o/l) \times 10^5$ $CO_2$ ($cm^3/cm^2 \cdot s \cdot cmHg$) | Selectivity $CO_2/H_2$ | $CO_2/CH_4$[a] |
|---|---|---|---|
| 10.5 | 0.183 | 81 | 240 |
| 26.4 | 0.155 | 76 | 210 |
| 41.4 | 0.145 | 81 | 190 |
| 68.7 | 0.120 | 69 | 160 |
| 108.8 | 0.087 | 53 | 120 |

[a]Estimated minimum selectivities.

EXAMPLE 2

$CO_2$ Membrane—PTMSP/PDADMAF/PTMSP

A PTMSP/PDADMAF/PTMSP membrane was prepared as described above using a PDADMAF layer cast from a solution containing 1.0 ml 5.4 wt % PDADMAF and 15 ml $H_2O$. The membrane performance was evaluated at room temperature using a feed gas containing 23.0% $CO_2$, 23.1% $CH_4$ in $H_2$ and a He sweep gas. Both streams were humidified by passage through 5° C. water bubblers. Performance results are listed below. $H_2$ and $CH_4$ were not detected in the permeate. Estimates of minimum $CO_2/CH_4$ and $CO_2/H_2$ selectivities are based on limits of detection of 500 ppm for $H_2$ and 25 ppm for $CH_4$ and the assumption that the permeances of these gases are independent of feed pressure.

| Feed (psig) | $(P_o/l) \times 10^5$ $CO_2$ ($cm^3/cm^2 \cdot s \cdot cmHg$) | Estimated Minimum Selectivity $CO_2/H_2$ | $CO_2/CH_4$ |
|---|---|---|---|
| 8.0 | 0.284 | 44 | 380 |
| 13.2 | 0.262 | 41 | 350 |
| 30.8 | 0.208 | 33 | 280 |
| 51.9 | 0.156 | 24 | 210 |
| 82.1 | 0.131 | 21 | 170 |
| 109.5 | 0.110 | 17 | 150 |

EXAMPLE 3

Alternative Configuration Of PDADMAF Membrane

An alternative MLC membrane was fabricated and consisted of a bottom support layer consisting of a polymeric microporous matrix. On top of this layer was cast a layer of PDADMAF as described above and which contained no surfactant. The top layer was PDMS and was cast as above. The membrane performance was evaluated at 23° C. using a feed consisting of 30.6%

$CO_2$, 34.4% $CH_4$ in $H_2$ and a $N_2$ sweep gas. Both feed and sweep gases were passed through 5° C. water bubblers.

| Feed (psig) | $(P_o/l) \times 10^5$ $CO_2$ (cm³/cm² · s · cmHg) | Selectivity $CO_2/H_2$ | Selectivity $CO_2/CH_4$ |
|---|---|---|---|
| 7.3 | 0.269 | 24 | a |
| 14.7 | 0.257 | 18 | a |
| 25.6 | 0.253 | 17 | 118 |
| 40.3 | 0.224 | 18 | 66 |
| 70.6 | 0.196 | 12 | 78 | a No $CH_4$ detected in the permeate

EXAMPLE 4

Effects Of Feed And Sweep Gas Humidification On Membrane Performance

A MLC membrane similar to that in Example 3 was fabricated. The bottom layer consisted of a polymeric microporous support. On top of this layer was cast a layer of poly(vinylbenzyltrimethylammonium fluoride), (PVBTAF) from an aqueous solution containing no surfactants. Membrane performance was evaluated at 23° C. using a feed consisting of 30.6% $CO_2$, 34.4% $CH_4$ in $H_2$ and a $N_2$ sweep gas. Both feed and sweep gases were passed through water bubblers thermostatted at 5°, 10°, 15°, or 20° C. as indicated below. The feed pressure was 40.0 psig throughout.

| Bubbler T (°C.) | $(P_o/l) \times 10^5$ $CO_2$ (cm³/cm² · s · cmHg) | Selectivity $CO_2/H_2$ | Selectivity $CO_2/CH_4$ |
|---|---|---|---|
| 5 | 0.178 | 60 | 160$^a$ |
| 10 | 0.259 | 69 | 230$^a$ |
| 15 | 0.322 | 54 | 232 |
| 20 | 0.317 | 18 | 76 |

$^a$No $CH_4$ detected; estimated minimum selectivity

EXAMPLE 5

$CO_2$ Membrane With PVBTAF Active Layer

A MLC membrane similar to that in Example 3 was fabricated. The bottom layer consisted of a polymeric microporous support. On top of this layer was cast a layer of poly(vinylbenzyltrimethylammonium fluoride), PVBTAF. PVBTAF is soluble in methanol and a 5 weight % methanol solution was used to cast the active layer. No surfactants were added to the PVBTAF solution and no top layer was used. The membrane performance was evaluated at 23° C. using a feed consisting of 30.6% $CO_2$, 34.4% $CH_4$ in $H_2$ and a $N_2$ sweep gas. Both feed and sweep gases were passed through 5° C. water bubblers.

| Feed P (psig) | $(P_o/l) \times 10^5$ $CO_2$ (cm³/cm² · s · cmHg) | Selectivity $CO_2/H_2$ | Selectivity $CO_2/CH_4{}^a$ |
|---|---|---|---|
| 5.3 | 0.602 | 87 | 1000$^a$ |
| 20.0 | 0.451 | 82 | 760$^a$ |
| 40.0 | 0.378 | 71 | 640$^a$ |
| 61.1 | 0.319 | 48 | 540$^a$ |
| 75.6 | 0.288 | 43 | 490 |

$^a$No $CH_4$ detected in the permeate; estimated selectivities based on $CH_4$ $(P_o/l) \times 10^5$ of 0.00059 cm³/cm² · s · cmHg

EXAMPLE 6

Membrane Performance When A Sweep Gas Was Not Used

A membrane was prepared by casting a layer of PVBTAF onto a microporous support as in Example 3. The membrane performance was evaluated at 23° C. without the use of a sweep gas to remove permeating gases. The feed gas (32.9% $CO_2$, 32.6% $CH_4$ in $H_2$) was humidified by passage through 5° C. water bubblers. For comparison, performance data was collected for same membrane using a $N_2$ sweep passed through 5° C. water bubblers. As shown below, the performance under the two sets of conditions is comparable.

| Feed P (psig) | $N_2$ Sweep | $(P_o/l) \times 10^5$ $CO_2$ (cm³/cm² · s · cmHg) | Selectivity $CO_2/H_2$ | Selectivity $CO_2/CH_4$ |
|---|---|---|---|---|
| 79.5 | no | 0.255 | 32 | 448 |
| 79.5 | yes | 0.327 | 42 | 743 |

EXAMPLE 7

$CO_2$ Membrane—PTMSP/PDADMAOAc/PTMSP

A PTMSP/PDADMAOAc/PTMSP was prepared as described above and the PDADMAOAc layer was cast from a solution containing 5 ml 2.52 wt % PDADMAOAc and 20 ml water, The performance of the membrane was evaluated at room temperature using a feed gas containing 23.0% $CO_2$, 23.1% $CH_4$ in $H_2$ and a He sweep gas. Both streams were humidified by passage through 2.5° C. or 5° C. water bubblers as indicated below. Performance results are listed below.

| Bubbler T (°C.) | Feed P (psig) | $(P_o/l) \times 10^5$ $CO_2$ (cm³/cm² · s · cmHg) | Selectivity $CO_2/H_2$ | Selectivity $CO_2/CH_4$ |
|---|---|---|---|---|
| 2.5 | 40.0 | 0.225 | 11.3 | 71 |
|  | 51.1 | 0.180 | 10.6 | — |
|  | 62.7 | 0.189 | 8.3 | 65 |
| 5.0 | 42.7 | 0.240 | 7.9 | 45 |

EXAMPLE 8

$H_2S$ Membrane—PDMS/PDADMAF/PDMS

A PDMS/PDADMAF/PDMS membrane, identical to the membrane used in Example 1, was evaluated at room temperature using a feed containing either 5.0% $H_2S$, 5.0% $CO_2$, 49.7% $CH_4$ in $H_2$ or 10.4% $H_2S$, 9.9% $CO_2$, 38.7% $CH_4$ in $H_2$ and a He sweep gas. Both streams were humidified by passage through 5° C. water bubblers. Performance data is listed below. $H_2$ was not detected in the permeate. $H_2S/H_2$ selectivities listed below are estimates of minimum values based on limits of detection of $H_2$ of 500 ppm and assuming that the permeance of $H_2$ is independent of feed pressure.

| Feed partial P (cmHg) | | $(P_o/l) \times 10^5$ (cm³/cm² · s · cmHg) | | Selectivity $H_2S$ to | | |
|---|---|---|---|---|---|---|
| $H_2S$ | $CO_2$ | $H_2S$ | $CO_2$ | $CO_2$ | $CH_4$ | $H_2{}^b$ |
| 4.2 | 4.2 | 0.98 | 0.14 | 7.0 | 890$^a$ | 100 |
| 5.4 | 5.3 | 0.84 | 0.11 | 7.6 | 760$^a$ | 85 |
| 9.6 | 9.5 | 0.76 | 0.10 | 7.6 | 690$^a$ | 77 |
| 13.8 | 13.6 | 0.64 | 0.09 | 7.1 | 580$^a$ | 65 |
| 17.9 | 17.7 | 0.59 | 0.08 | 7.4 | 630 | 60 |
| 21.5 | 21.2 | 0.49 | 0.06 | 8.2 | 520 | 50 |

-continued

| Feed partial P (cmHg) | | $(P_o l) \times 10^5$ (cm$^3$/cm$^2$ · s · cmHg) | | Selectivity $H_2S$ to | | |
|---|---|---|---|---|---|---|
| $H_2S$ | $CO_2$ | $H_2S$ | $CO_2$ | $CO_2$ | $CH_4$ | $H_2$[b] |
| 25.2 | 24.8 | 0.35 | 0.04 | 8.8 | 330 | 35 |
| 29.5 | 29.1 | 0.36 | 0.05 | 7.2 | 320 | 37 |
| 36.1 | 34.5 | 0.33 | 0.04 | 8.3 | 300 | 34 |
| 44.3 | 42.2 | 0.37 | 0.05 | 7.4 | 310 | 38 |
| 49.2 | 46.9 | 0.39 | 0.06 | 6.5 | 330 | 40 |
| 57.1 | 54.5 | 0.33 | 0.05 | 6.6 | 260 | 34 |

[a]$CH_4$ not observed in the permeate; selectivity based on $CH_4$ ($P_o$/l) $\times 10^5$ of 0.0011.
[b]Estimated Minimum Selectivity.

EXAMPLE 9

$H_2S$ Membranes—PDMS/PDADMAF/PDMS

A second PDMS/PDADMAF/PDMS membrane, identical to the one in Example 1, was evaluated at room temperature using a feed containing either 1.0% $H_2S$, 1.0% $CO_2$, 48.2% $CH_4$ or 5.0% $H_2S$, 5.0% $CO_2$, 38.8% $CH_4$ in $H_2$ and a He sweep gas. Both streams were humidified by passage through 5° C. water bubblers. Performance data is listed below. $CH_4$ and $H_2$ were not observed in the permeate under the experimental conditions. $H_2S/CH_4$ and $H_2S/H_2$ selectivities listed below are estimates of minimum values based on limits of detection of $H_2$ of 500 ppm and independent of feed pressure.

| Feed partial P (cmHg) | | $(P_o/l) \times 10^5$ (cm$^3$/cm$^2$ · s · cmHg) | | Selectivity $H_2S$ to | | |
|---|---|---|---|---|---|---|
| $H_2S$ | $CO_2$ | $H_2S$ | $CO_2$ | $CO_2$ | $CH_4$[a] | $H_2$[a] |
| 2.44 | 2.51 | 1.88 | 0.156 | 12.1 | 1980 | 260 |
| 3.31 | 3.41 | 1.23 | 0.136 | 9.0 | 1300 | 170 |
| 4.03 | 4.15 | 1.12 | 0.147 | 7.6 | 1180 | 150 |
| 4.83 | 4.97 | 0.913 | 0.133 | 6.9 | 960 | 130 |
| 5.39 | 5.55 | 0.839 | 0.131 | 6.4 | 880 | 120 |
| 7.78 | 7.84 | 0.731 | 0.100 | 7.3 | 770 | 100 |
| 11.08 | 11.17 | 0.615 | 0.094 | 6.5 | 650 | 85 |
| 15.00 | 15.12 | 0.568 | 0.093 | 6.1 | 600 | 80 |
| 18.89 | 19.04 | 0.456 | 0.078 | 5.9 | 480 | 60 |
| 22.96 | 23.14 | 0.425 | 0.078 | 5.5 | 450 | 60 |
| 26.82 | 27.04 | 0.372 | 0.073 | 5.1 | 390 | 50 |
| 29.69 | 29.93 | 0.422 | 0.086 | 4.9 | 440 | 60 |

[a]Estimated minimum selectivities.

EXAMPLE 10

$H_2S$ Membrane—PDMS/PVBTAF/PDMS

A composite membrane consisting of PDMS top and bottom layers and an active middle layer of PVBTAF was fabricated using a 5% PVBTAF in methanol solution with no added surfactant. The membrane was tested evaluated at 30° C. using a feed gas containing 10.3% $H_2S$, 10.0% $CO_2$ in $CH_4$ and a He sweep gas. Both streams were humidified by passage through 5° C. water bubblers. Performance data is listed below. $CH_4$ was not observed in the permeate under the experimental conditions. $H_2S/CH_4$ selectivities listed below are estimates of minimum values based on a limit of detection of $CH_4$ of 50 ppm and assuming that the permeance of $CH_4$ is independent of feed pressure,

| Feed P (psig) | $(P_o/l) \times 10^5$ (cm$^3$/cm$^2$ · s · cmHg) | | Selectivity $H_2S$ to | |
|---|---|---|---|---|
| | $H_2S$ | $CO_2$ | $CO_2$ | $CH_4$ (estimated) |
| 2.2 | 0.466 | 0.0597 | 7.8 | 1000 |
| 12.6 | 0.384 | 0.0544 | 7.1 | 820 |
| 26.5 | 0.316 | 0.0449 | 7.0 | 680 |
| 44.9 | 0.268 | 0.0377 | 7.1 | 570 |
| 65.5 | 0.248 | 0.0333 | 7.4 | 530 |
| 80.1 | 0.265 | 0.0300 | 8.8 | 570 |
| 100.3 | 0.293 | 0.0300 | 9.8 | 630 |

EXAMPLE 11

$H_2O$ Membranes—PDMS/PDADMAF/PDMS

To determine the water permeation properties of composite membranes, a PDMS/PDADMAF/PDMS membrane, identical to the one used in Example 4, was evaluated at room temperature using a feed (23.0% $CO_2$, 23.1% $CH_4$ in $H_2$) humidified by passage through water bubblers at the temperature indicated below and a dry $N_2$ sweep gas. Hygrometers are placed at the feed inlet and sweep exit and the resulting dew points were used to calculate water vapor pressures. Data at four different feed bubbler temperatures is listed below.

| Bubbler T (°C.) | $(P_o/l) \times 10^5$ (cm$^3$/cm$^2$ · s · cmHg) | | | | Selectivity, $H_2O$ to | | |
|---|---|---|---|---|---|---|---|
| | $CO_2$ | $CH_4$ | $H_2$ | $H_2O$ | $CO_2$ | $CH_4$ | $H_2$ |
| 20 | 0.159 | 0.00122 | 0.0118 | 5.38 | 34 | 4400 | 460 |
| 15 | 0.0994 | — | 0.00891 | 5.35 | 54 | — | 600 |
| 10 | 0.0625 | 0.00298 | 0.00844 | 5.72 | 92 | 1920 | 680 |
| 5 | 0.0402 | 0.00474 | 0.00847 | 5.94 | 150 | 1250 | 700 |

EXAMPLE 12

Composite Membranes With More Than One Active Layer

It is possible to fabricate multilayer composite membranes in which there is more than one layer of polyelectrolyte. For example, a five-layer composite of the form PDMS/PDADMAF/PDMS/PDADMAF/PDMS was fabricated and tested. The PDADMAF layers were cast from a solution containing 15 ml 2.4 wt % PDADMAF and 0.01 g of 1.0 wt % SDS. As expected, permeances are lower than those of the three-layer composites and, on average, selectivities are better. Results for the five-layer composite at room temperature using a 23.0% $CO_2$, 23.1% $CH_4$ in $H_2$ feed at 40.6 psig and a $N_2$ sweep is listed below. $CH_4$ was not detected in the permeate. Minimum values of $CO_2/CH_4$ selectivities were estimated as described in Example 2.

| Bubbler T (°C.) | $(P_o/l) \times 10^5$ $CO_2$ (cm$^3$/cm$^2$ · s · cmHg) | Selectivity | |
|---|---|---|---|
| | | $CO_2/H_2$ | $CO_2/CH_4$[a] |
| 5 | 0.0941 | 62 | 89 |
| 10 | 0.161 | 38 | 71 |

[a]Estimated minimum selectivites.

EXAMPLE 13

Comparative Example—PDMS/DADMACl/PDMS Membrane

A PDADMACl composite membrane was prepared using the techniques descri bed above. The PDAD-MACl layer was cast from a solution containing 20 ml 2.2 wt % PDADMACl and 7 drops of 1 wt % aqueous solution of Surfynol 61. The membrane performance was evaluated for comparative purposes. The experimental conditions were identical to those of Example 1 and the results are listed below. The pressure versus permeance relationship implies that facilitated transport of $CO_2$ does not occur. In fact, $CO_2$ permeance increases slightly with increasing pressure as did the permeance of $H_2$ and $CH_4$. Permeation is nonselective.

| Feed (psig) | $(P_o/l) \times 10^5$ $CO_2$ (cm³/cm² · s · cmHg) | Selectivity $CO_2/H_2$ | $CO_2/CH_4$ |
|---|---|---|---|
| 10.9 | 0.00523 | 2.0 | — |
| 23.1 | 0.00522 | 1.2 | 1.4 |
| 40.7 | 0.00684 | 1.2 | 1.2 |
| 62.2 | 0.00798 | 1.1 | 1.1 |

EXAMPLE 14

Comparative Example—PDMS Membrane

For reference, the membrane properties of the silicone rubber (PDMS) used in multilayer composite membranes were determined. The feed (23.0% $CO_2$, 23.1% $CH_4$ in $H_2$) was passed through 5 C water bubblers and a dry $N_2$ sweep gas was used. Hygrometers were placed at the feed inlet and sweep exit as in Example 11. Data was collected at two feed pressures, 24.8 and 43.0 psig. For a 48 μm thick membrane, the following data was collected:

| Feed P (psig) | Feed Bubbler T(°C.) | Dew Points (C) Feed | Permeate | $P_o$ (Barrers) $CO_2$ | $CH_4$ | $H_2$ | $H_2O$ |
|---|---|---|---|---|---|---|---|
| 24.8 | 5 | 5.0 | −17.4 | 762 | 210 | 186 | 4763 |
| 43.0 | 5 | 5.7 | −18.6 | 715 | 207 | 182 | 3943 |
|  | 10 | 9.4 | −17.9 |  |  |  | 3192 |
|  | 15 | 14.2 | −15.7 |  |  |  | 2819 |
|  | 20 | 19.3 | −12.0 |  |  |  | 2865 |

The permeabilities of $CO_2$, $CH_4$, and $H_2$ were independent of dew point and the values reported above the averages for all data 43.0 psig feed. Stern and Bhide report that the $H_2S$ permeability of PDMS is 8550 at 30° C.

EXAMPLE 15

Comparative Example—PTMSP Membrane

The performance of a PTMSP membrane, 72 μm, thick was evaluated at 30° C. using a dry feed (5.1% $H_2S$, 5.1% $CO_2$ in $CH_4$) and He sweep gases. Data was obtained at a feed pressure of 17.1 psia and a sweep pressure of 15.0 psia. (Note: it was not assumed that the partial pressures of gas in the sweep is small relative to the pressure in the feed). As expected from literature data, permeances are very large.

| $(P_o l) \times 10^5$ (cm³/cm² · s · cmHg) | | | $P_o$ (Barrers) | | |
|---|---|---|---|---|---|
| $H_2S$ | $CO_2$ | $CH_4$ | $H_2S$ | $CO_2$ | $CH_4$ |
| 73.1 | 48.5 | 23.8 | 52600 | 34920 | 17140 |

We claim:

1. A process for separating acid gas from a gas mixture containing acid gas and at least one non-acid gas component, said process comprising bringing said gas mixture into contact with a multilayer composite membrane comprising an essentially nonselective polymeric support layer and an active separating layer comprising a polyelectrolyte polymer which contains cationic groups which are electrostatically associated with anions for which the $pK_a$ of the conjugate acid is greater than 3; such that said multilayer composite membrane selectively permeates the acid gas thereby removing it from the gas mixture.

2. The process of claim 1 wherein said polyelectrolyte polymer contains bound water which solvates the anion.

3. The process of claim 1 wherein said acid gas is selected from the group consisting of $CO_2$, $H_2S$ and mixtures thereof.

4. The process of claim 1 wherein the non-acid gas component in the gas mixture is selected from the group consisting of hydrogen, methane, nitrogen, carbon monoxide and mixtures thereof.

5. The process of claim 1 wherein the polymeric support layer is non-porous.

6. the process of claim 5 wherein said non-porous polymeric support layer is comprised of poly(dimethylsiloxane) or poly(trimethylsilyl propyne).

7. The process of claim 1 wherein said polyelectrolyte polymer is selected from the group consisting of poly(diallyldimethylammonium fluoride), poly(diallyldimethylammonium acetate), poly(vinylbenzyltrimethylammonium fluoride), poly(vinylbenzylammonium acetate) and mixtures thereof.

8. The process of claim 1 wherein a sweep gas is used to remove the acid gases which are permeated by the membrane.

9. The process of claim 1 wherein said multilayer composite membrane is a three layer membrane wherein the active separating layer is positioned between two nonselective polymeric support layers.

10. The process of claim 1 wherein the polymeric support layer is porous.

11. The process of claim 10 wherein the pore size of the porous polymeric support is asymmetrically distributed.

12. The process of claim 1 wherein the multilayer composite membrane further comprises a gas-permeable non-porous polymer layer, a polyelectrolyte polymer layer and a gas-permeable porous polymer layer.

13. The process of claim 1 wherein said gas mixture also contains water vapor which also permeates through the membrane.

14. A process for separating water vapor from a gas stream comprising water vapor and at least one other non-acid gas component, said process comprising bringing said gas mixture into contact with a multilayer composite membrane comprising an essentially nonselective polymeric support layer and an active separating layer comprising a polyelectrolyte polymer which contains cationic groups which are electrostatically associated with anions for which the $pK_a$ of the conjugate acid is greater than 3; such that said multilayer composite membrane selectively permeates the water vapor thereby removing it from the gas mixture.

15. The process of claim 14 wherein the non-acid gas component in the gas mixture is selected from the group consisting of hydrogen, methane, nitrogen, carbon monoxide and mixtures thereof.

16. The process of claim 14 wherein said polyelectrolyte polymer is selected from the group consisting of poly(diallyldimethylammonium fluoride), poly(diallyldimethylammonium acetate), poly(vinylbenzyltrimethylammonium fluoride, poly(vinylbenzyltrimethylammonium acetate), and mixtures thereof.

17. The process of claim 14 wherein a sweep gas is used to remove the water vapor which is permeated by the membrane.

* * * * *